US010838947B2

(12) United States Patent
Packirisamy (10) Patent No.: US 10,838,947 B2
(45) Date of Patent: Nov. 17, 2020

(54) CONSISTENCY CHECK FOR FOREIGN KEY DEFINITION

(71) Applicant: SAP SE, Walldorf (DE)

(72) Inventor: Gopu Packirisamy, Kuthalam (IN)

(73) Assignee: SAP SE, Walldorf (DE)

( * ) Notice: Subject to any disclaimer, the term of this patent is extended or adjusted under 35 U.S.C. 154(b) by 317 days.

(21) Appl. No.: 15/872,381

(22) Filed: Jan. 16, 2018

(65) Prior Publication Data

US 2019/0220531 A1   Jul. 18, 2019

(51) Int. Cl.
    *G06F 16/23*   (2019.01)
    *G06F 16/22*   (2019.01)
    *G06F 16/9535* (2019.01)

(52) U.S. Cl.
    CPC ...... *G06F 16/2365* (2019.01); *G06F 16/2282* (2019.01); *G06F 16/9535* (2019.01)

(58) Field of Classification Search
    USPC ........................................ 707/690
    See application file for complete search history.

(56) References Cited

U.S. PATENT DOCUMENTS

2007/0143314 A1* 6/2007 Thomsen ............... G06F 16/21
                                                  707/999.1
2009/0292711 A1* 11/2009 Konik et al. ........... G06F 17/30
                                                  707/999.1
2017/0083566 A1* 3/2017 Das et al. ......... G06F 16/24554

* cited by examiner

*Primary Examiner* — Muluemebet Gurmu
(74) *Attorney, Agent, or Firm* — Buckley, Maschoff & Talwalkar LLC (57) ABSTRACT

A system includes reception of a request to check a foreign key definition associated with a database table, determination of a first foreign key relation of the foreign key definition, determination of whether the database table is a foreign key relation table identified in the first foreign key relation, and, if the database table is the foreign key relation table identified in the first foreign key relation, determine whether a data type of a foreign key field identified in the first foreign key relation is identical to a data type of a check table field identified in the foreign key relation, and return a first result associated with the first foreign key definition based on the determination of whether the data type of the foreign key field identified in the first foreign key relation is identical to the data type of the check table field identified in the foreign key relation. If the database table is not the foreign key relation table identified in the first foreign key relation, determine whether the data type of the foreign key field identified in the first foreign key relation is identical to the data type of the check table field identified in the foreign key relation, and determine whether the foreign key field is a runtime field of a runtime structure, and return a second result associated with the first foreign key relation based on the determination of whether the data type of the foreign key field identified in the first foreign key relation is identical to the data type of the check table field identified in the foreign key relation, and the determination of whether the foreign key field is a runtime field of a runtime structure.

15 Claims, 7 Drawing Sheets

Display Foreign Key T150F-BSTAR

Short Text
Check Table    T064B

Foreign Key Fields

| Check Table | Chk Tbl Field | Foreign Key Relation Tbl | Foreign Key Field | Generic | Constant |
|---|---|---|---|---|---|
| T064B | SPRAS | SYST | SPRAS | ☐ | |
| T064B | BSTAR | T150F | BSTAR | ☐ | |
| | | | | ☐ | |
| | | | | ☐ | |

| Display Foreign Key TMCBIWC-MCINF | | | | | |
|---|---|---|---|---|---|
| Short Text | Info Structure with Connection to BW | | | | |
| Check Table | TMC4 | | | | |
| Foreign Key Fields | | | | | |
| Check Table | Chk Tbl Field | Foreign Key Relation Tbl | Foreign Key Field | Generic | Constant |
| TMC4 | MANDT | TMCBIWC | MCINF | ☐ | |
| | | | | ☐ | |
| | | | | ☐ | |
| | | | | ☐ | |

| Display Field TMC4-MANDT | |
|---|---|
| Data Element Attribute | |
| Data Element | MANDT |
| Short Description | Client |
| Domain | MANDT |
| Data Type | CLNT |
| No. of Characters | 3 |

| Display Field TMCBIWC-MCINF | |
|---|---|
| Data Element Attribute | |
| Data Element | MCINF |
| Short Description | Name of Information Structure |
| Domain | MCINF |
| Data Type | CHAR |
| No. of Characters | 8 |

Display Foreign Key T5ITT7-WTNPA

Short Text
Check Table    T512W

| Foreign Key Fields | | | | | |
|---|---|---|---|---|---|
| Check Table | Chk Tbl Field | Foreign Key Relation Tbl | Foreign Key Field | Generic | Constant |
| T512W | MANDT | T5ITT7 | MANDT | ☐ | |
| T512W | MOLGA | | | ☐ | '15' |
| T512W | LGART | T5ITT7 | WTNPA | ☐ | |
| T512W | ENDDA | | | ☑ | |

CONSISTENCY CHECK FOR FOREIGN KEY DEFINITION

BACKGROUND

Enterprise software systems receive, generate, and store data related to many aspects of an enterprise. These systems also store metadata which defines the logical structure of objects used in application development and the mapping of the objects to the underlying data. Objects may include tables, views, types, and lock objects. The metadata may be created and/or modified by a database system provider, a partner developer or a customer developer.

Database metadata may define foreign keys and corresponding check tables. A foreign key links two tables by assigning foreign key fields of the first table (i.e., the foreign key table) to the primary key fields of the second table (i.e., the check table). When values are to be stored in the foreign key fields of the first table, the system first determines whether the check table contains a record having a key corresponding to the values. The values are considered valid if such a record exists, and invalid if no such record exists.

In order for the above-described check to function correctly, the foreign key relationship must be properly defined within the database metadata. Improper definitions may lead to inconsistencies within the stored data. Although metadata development tools typically facilitate the definition of foreign keys, such tools fail to ensure the consistency and integrity of such definitions. What is needed is a system to efficiently check the consistency of foreign key definitions.

DETAILED DESCRIPTION

The following description is provided to enable any person in the art to make and use the described embodiments. Various modifications, however, will remain readily apparent to those in the art.

Generally, some embodiments provide checking of one or more foreign key definitions and returning of corresponding results. The check may take into account definitions of foreign key fields which exist in a named foreign key table, foreign key fields which exist in a table or view which is different from the named foreign key table, constant value keys, generic foreign key fields, and foreign key fields from runtime structures.

According to some embodiments, a metadata developer may invoke an application programming interface to perform a foreign key definition check of one table, of several tables, or of all tables defined in the system.

Figure 1:
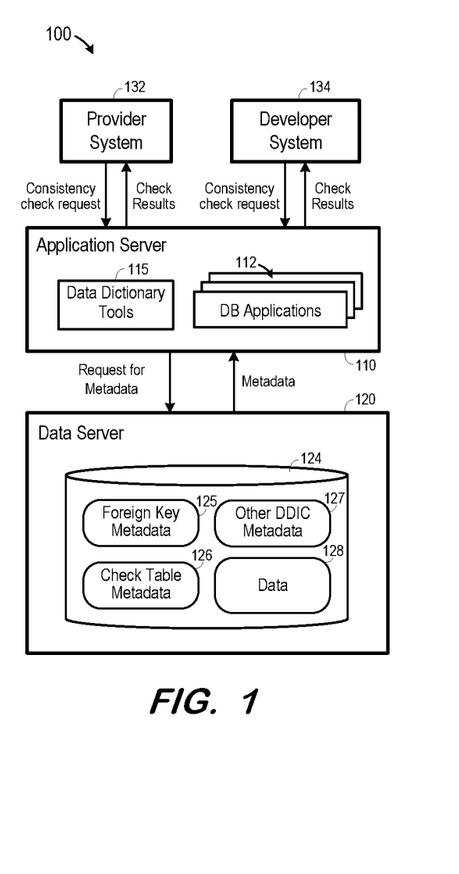
FIG. 1 is a block diagram of a system architecture according to some embodiments.

FIG. 1 is a block diagram of system 100 according to some embodiments. Embodiments are not limited to the FIG. 1 system. System 100 includes application server 110, data server 120, provider system 132 and developer system 134. The elements of system 100 may communicate with one another over any number of intermediate public or private networks, including but not limited to the World Wide Web.

Application server 110 may comprise one or more computing devices to execute and provide services to database applications 112. Database applications 112 may comprise program code written in any suitable programming language which is executable by application server 110 (e.g., executable by one or more processing units of application server 110) to provide functionality to clients based, for example, on data stored in data server 120. Such functionality may include data analysis, forecasting, data presentation, or the like.

One or more of applications 112 is developed based on metadata describing objects as described above. In this regard, data dictionary tools 115 may provide functionality to generate, modify and view such metadata. This functionality may include creation of tables, creation of data elements and domains, creation of structures and table types, creation of search help data, creation of lock objects, and creation of database views. Data dictionary tools 115 may also comprise program code executable by application server 110 to check foreign key definitions as described herein. The program code may comprise an implementation of an interface provided to client systems.

Provider system 132 and developer system 134 are examples of client systems according to some embodiments. Each system may execute one or more client applications to communicate with data dictionary tools 115 and other development tools to create, modify and view metadata defining objects within data server 120. Provider system 132 may be operated by a developer employed by a provider of data server 120, while developer system 134 may be operated by a developer employed by a customer of the database provider.

As shown in FIG. 1, provider system 132 or developer system 134 may issue a consistency check request to application server 110 according to some embodiments. In response, application server 110 provides the requesting system with results of the check. According to some embodiments, the request is a call to an exposed interface provided by application server 110. In other embodiments, the request is a command sent to data dictionary tools 115, which in turn calls such an interface provided by core services of application server 110.

In response to the request to perform the consistency check, application server 110 requests data dictionary metadata from data server 120. As illustrated, data server 120 provides the requested metadata to application server 110 in response. The metadata may include a database table as a foreign key table and, for each foreign key field of the foreign key table, specify a check table and a check table field. The metadata may also include type, length and other metadata defining each specified foreign key field and check table field. Application server 110 uses the metadata as described below to perform the consistency check.

Data server 120 includes database 124 stored within one or more data storage devices such as but not limited to Flash memory, fixed disk drives, and volatile or non-volatile Random Access Memory. Database 124 stores data 128 (e.g., enterprise data, sales data, employee data) and metadata defining the data as described above. The metadata includes foreign key metadata 125, check table metadata 126 and other metadata of the data dictionary. Data 128 and metadata 125, 126 and 127 are illustrated separately for explanatory purposes, and are not necessarily physically separated from one another within database 124.

Data server 120 may comprise any query-responsive data server that is or become known, including but not limited to a structured-query language (SQL) relational database management system. Data server 120 may provide data from data 128 in response to received queries, as well as backup, indexing and other known functions of a database management system.

Database 124 may comprise any one or more data sources which are or become known, including but not limited to database views, spreadsheets, relational databases and/or OnLine Analytical Processing cubes. The data sources of data server 120 may be distributed among several relational databases, dimensional databases, and/or other data sources. Embodiments are not limited to any number or types of data sources. In some embodiments, database 124 may comprise one or more of conventional tabular data, row-based data, column-based data, and object-based data. Moreover, the data may be indexed and/or selectively replicated in an index to allow fast searching and retrieval thereof. Data server 120 may support multi-tenancy to separately support multiple unrelated clients by providing multiple logical database systems which are programmatically isolated from one another.

Database 124 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database). A hardware processing system implementing data server 110 (e.g., a server blade) may be physically integrated with or separate from a hardware storage system (e.g., a fixed disk array, volatile Random Access Memory) implementing database 124.

Figure 2:
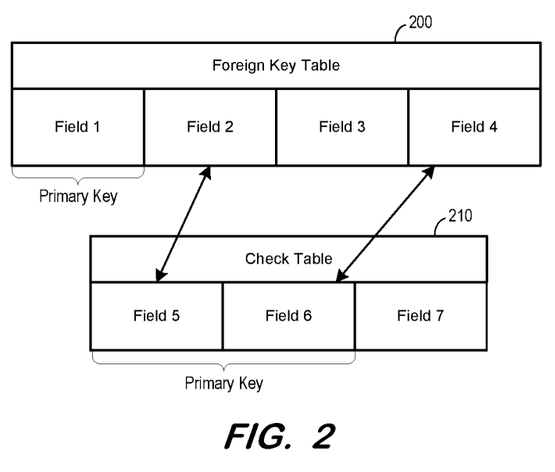
FIG. 2 illustrates a portion of a foreign key table and a portion of a check table according to some embodiments.

FIG. 2 illustrates foreign key table schema 200 and check table schema 210. According to some embodiments, schemas 200 and 210 may be defined by foreign key metadata 125 and check table metadata 126, respectively. Foreign key table schema 200 includes four fields (Field 1, Field 2, Field 3 and Field 4), and Field 1 is defined as the primary key field of the foreign key table. Check table 210 includes Field 5, Field 6 and Field 7, with its primary key being composed of Field 5 and Field 6.

Field 2 of schema 200 is a foreign key field associated with Field 5 of schema 210, and Field 4 of schema 200 is a foreign key field associated with Field 6 of schema 210. Fields 5 and 6 are therefore considered check fields for their associated foreign key fields. Accordingly, the values of Field 2 and Field 4 for a given row of the table of data 128 defined by schema 200 are considered valid only if these values form a primary key of an existing row of the table of data 128 defined by check table schema 210.

Figure 3:
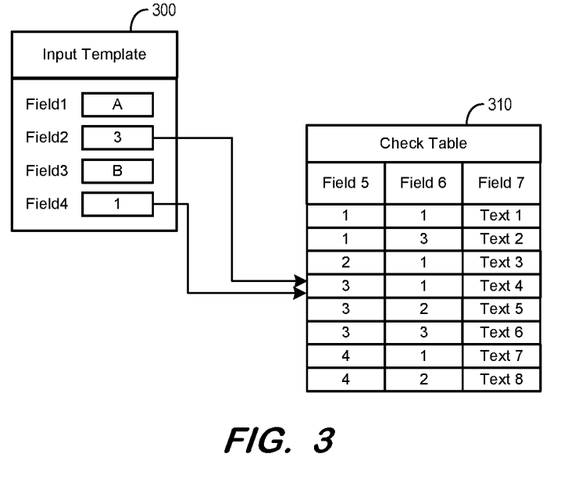
FIG. 3 illustrates use of a check key table to verify input data according to some embodiments.

FIG. 3 illustrates data validation based on the foreign key definition of FIG. 2. Data validation may be executed by application server 110 in response to any request to add or modify data of a table row. In one example, application server 110 may execute an application based on the FIG. 2 schema. During execution of the application, the user is provided with input template 300 to populate the fields of a row of the stored database table defined by schema 200.

It will be assumed that the user enters values into input template 300 as illustrated in FIG. 3. It is then determined whether check table 310 contains a record having a primary key identical to that defined by the values in the foreign key fields of the input template, with respect to the check table primary key definition of schemas 300 and 310. The entry is valid if such a record exists, and invalid if not.

In the FIG. 3 example, foreign key fields Field 2 and Field 4 define a primary key of "3", "1" for check table 310. As shown, check table 310 includes a record having a primary key of Field 5="3" and Field 6="1". Accordingly, the entry of input table 300 is determined as valid. If, for example, the entry of input table 300 included Field 2="2" and Field 4="2", the entry would be rejected because check table 310 does not include a record having the key of Field 5="2" and Field 6="2".

Figure 4:
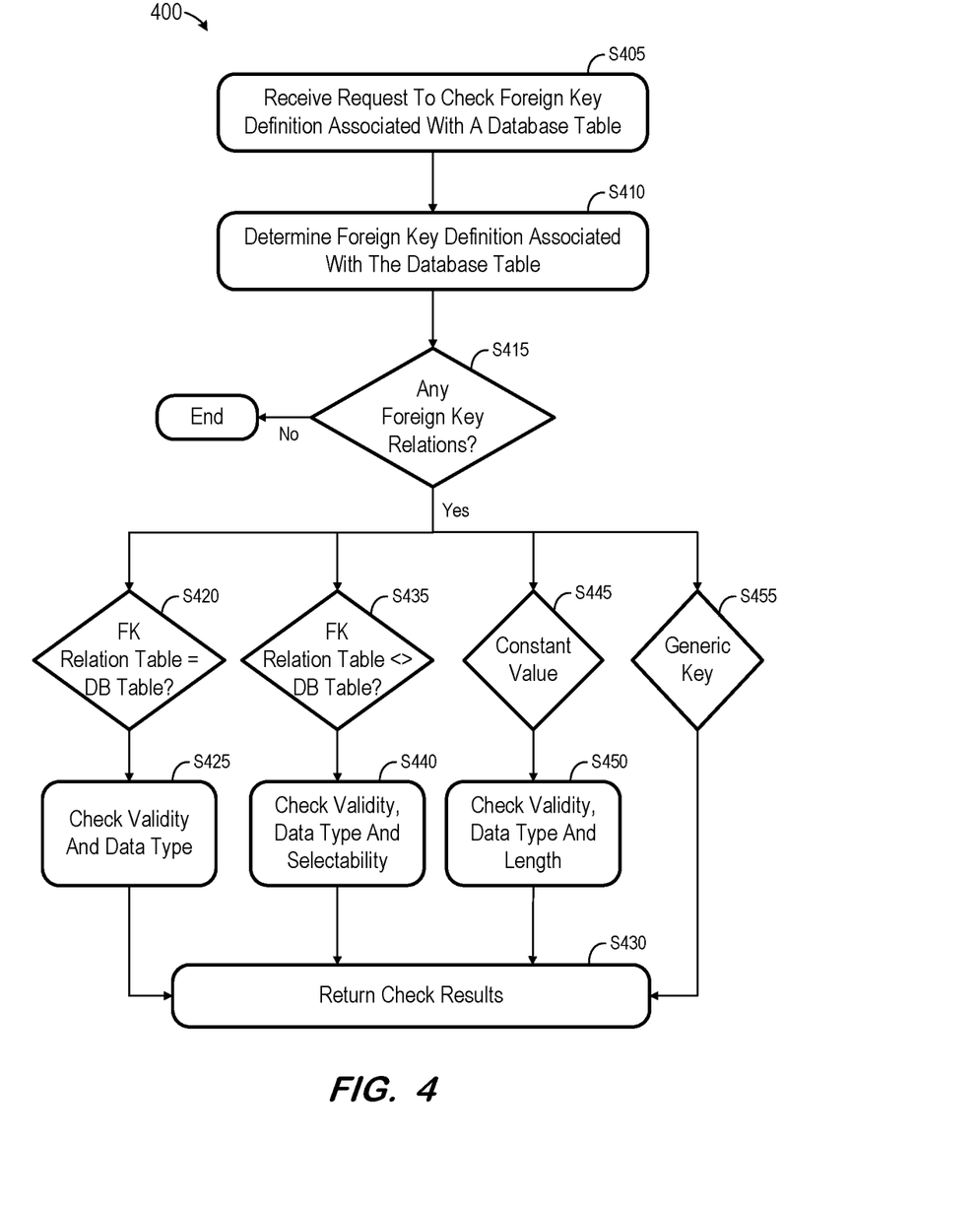
FIG. 4 is a flow diagram of a process to check a foreign key definition according to some embodiments.

FIG. 4 comprises a flow diagram of process 400 to check foreign key definitions according to some embodiments. In some embodiments, various hardware elements of system 100 execute program code to perform process 400. The hardware elements may include one or more processing units (e.g., processors, processor cores, processor threads). Process 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S405, a request is received to check a foreign key definition of a database table. As described above, the request may comprise a call to an interface exposed by application server 110 to developer system 134. In other embodiments, the request is sent by developer system 134 to data dictionary tools 115 (e.g., via a user interface provided by data dictionary tools 115), which in turn call a corresponding interface provided by core services of application server 110.

In response to the received request, a foreign key definition associated with the database table is determined at S410. As described above, foreign key definitions are specified by metadata associated with underlying data and objects (e.g., tables, views) based on the underlying data. According to some embodiments, foreign key data 135 is checked at S410 to determine whether the specified database table is a foreign key table (i.e., whether the database table is associated with any foreign key definitions).

At S415, it is determined whether a foreign key definition was determined for the database table. If not, process 400 terminates as there is no foreign key definition to check. According to some embodiments, a result may be returned indicating that the database table does not include any foreign key fields.

If a foreign key definition was determined for the database table at S415, each foreign key relation of the foreign key definition is evaluated at S420, S435, S445 or S455 to determine a type of check to perform on the foreign key relation.

Figure 5:
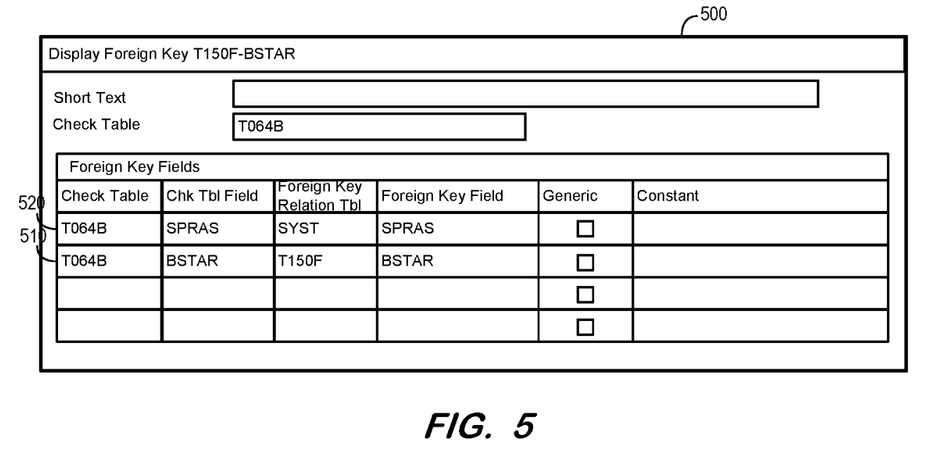
FIG. 5 illustrates a user interface displaying foreign key definition metadata according to some embodiments.

For example, S420 determines whether a foreign key relation table specified by a foreign key relation is the same as the database table under evaluation. FIG. 5 illustrates user interface 500 displaying foreign key definition for the field BSTAR of database table T150F according to some embodiments. User interface 500 may be provided by data dictionary tools 115 to allow a developer to view foreign key metadata 125 according to some embodiments.

According to user interface 500, the foreign key definition of field BSTAR of database table T150 is associated with two foreign key relations 510 and 520. With respect to S420, the foreign key relation table of relation 510 is identical to the database table under evaluation (i.e., T150F). Accordingly, the validity and data type of the foreign key field of the foreign key relation are checked at S425. Checking the validity includes determining whether the foreign key field name of the foreign key relation exists in the database table. Checking the data type, on the other hand, includes determining whether the data type of the foreign key field of the foreign key relation is the same as the data type of the check table field which the foreign key relation associates with the foreign key field.

Checking the validity of a foreign key relation may therefore include requesting metadata of the database table from metadata 127 to determine the field names of the database table. The foreign key field name is checked against these field names to determine whether it exists therein. In the present example, it will be assumed that database table T150F includes a field named BSTAR. Accordingly, foreign key relation 510 passes the validity check.

Checking the data type may also include requesting metadata from database 124. The requested metadata may include check table metadata 126 to determine the data type of the check table field of the foreign key relation, and foreign key metadata 125 to determine the data type of the foreign key field of the foreign key relation. As shown in interface 500, the check table field of definition 510 is BSTAR and the foreign key field of relation 510 is also BSTAR. Embodiments are not limited to identically-named foreign key and check table fields.

Accordingly, it is determined at S425 whether the data type of field BSTAR of table T064B is compared with the data type of field BSTAR of table T150F. A more-detailed description of a data type check will be provided below with respect to FIGS. 6A-6C S435 identifies foreign key relations of the foreign key definition for which the foreign key relation table is not identical to the database table under evaluation. Foreign key relation 520 is such a relation, since it specifies foreign key relation table SYST and corresponds to database table T150. Validity and data type checks are executed on foreign key relation 520 at S440 as described above. Moreover, it is determined whether the specified foreign key relation table is selectable. This determination may comprise issuing a SELECT statement to database 124 targeting the foreign key relation table. The selectability determination is intended to identify structures (e.g., runtime structures) which are not permitted to be specified as foreign key relation tables in a foreign key relation. In the present example, foreign key relation table SYST of foreign key relation 520 is a non-selectable structure and therefore the check at S440 results in an error.

Figure 6A:
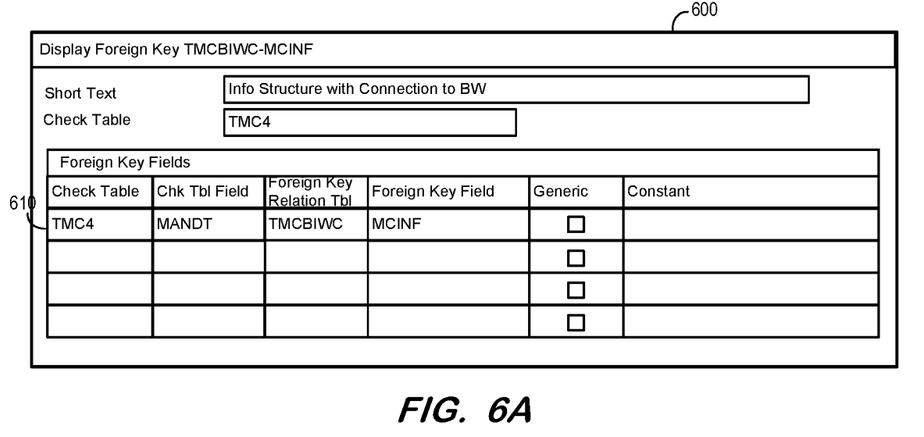
FIG. 6A illustrates a user interface displaying foreign key definition metadata according to some embodiments.

FIG. 6A illustrates interface 600 of a foreign key definition including foreign key relation 610 associated with database table TMCBIWC. The foreign key relation table of relation 610 is identical to the database table, so flow proceeds from S420 to S425. At S425, it is determined whether the foreign key field MCINF exists in database table TMCBIWC and whether check table field MANDT exists in check table TMC4.

Figure 6B:
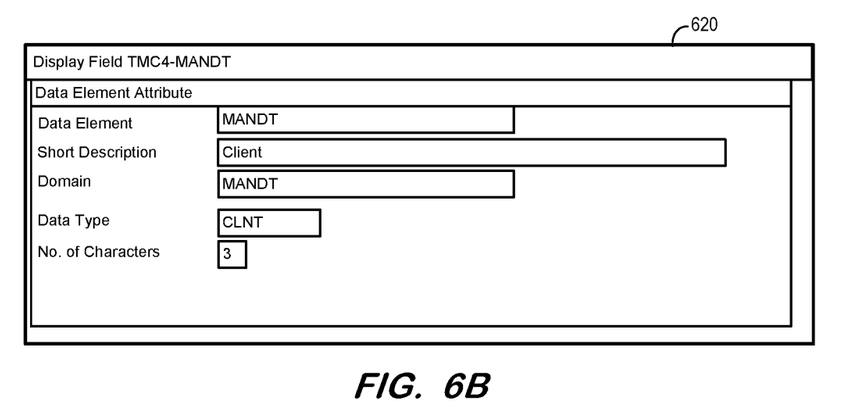
FIG. 6B illustrates a user interface displaying data element attributes according to some embodiments.
Figure 6C:
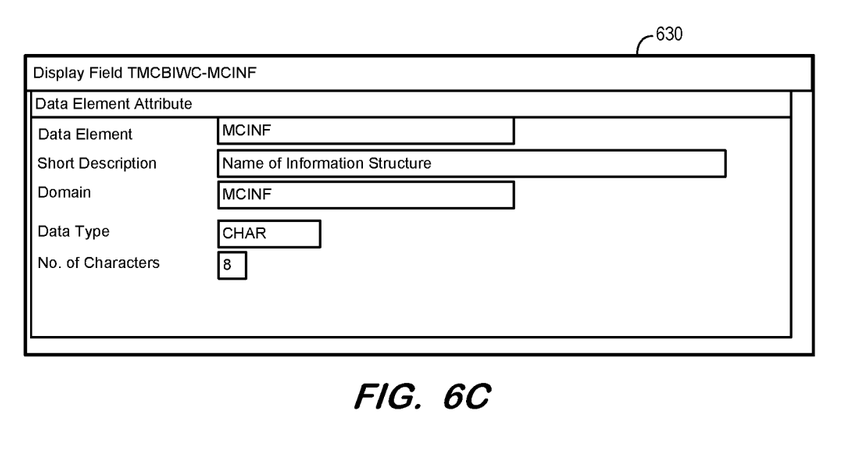
FIG. 6C illustrates a user interface displaying data element attributes according to some embodiments.

Interfaces 620 and 630 of FIGS. 6B and 6C illustrate metadata associated with check table field MANDT and with foreign key field MCINF, respectively. The metadata may be used to perform a data type check as described herein. Interfaces 620 and 630 may be provided by data dictionary tools 115, which queries foreign key metadata 125 and check table metadata 126 for the displayed metadata.

As shown in interface 620, the data type of check table field MANDT in check table TMC4 is CLNT having three characters. Interface 630 shows that the data type of foreign key field MCINF in database table TMCBIWC is CHAR having eight characters. Accordingly, it is determined at S425 that the data types do not match.

Figure 7:
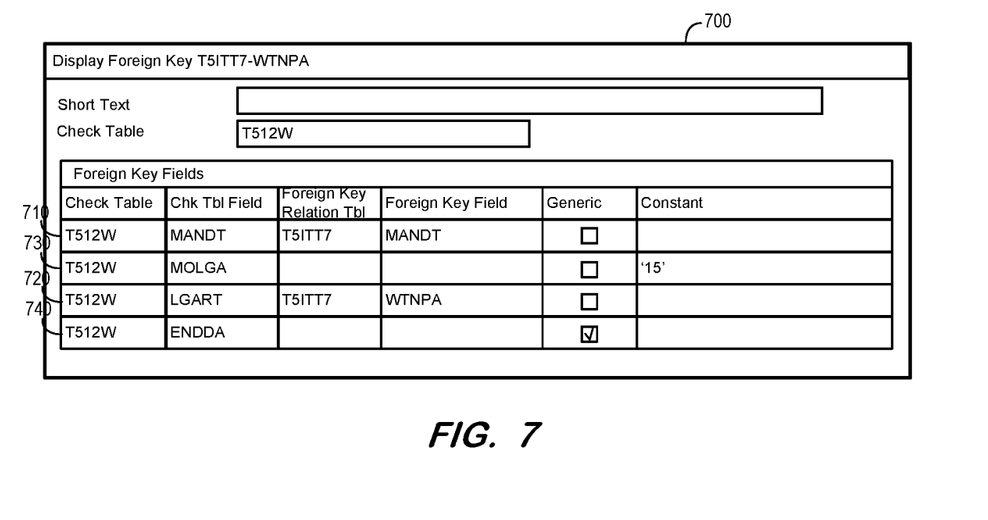
FIG. 7 illustrates a user interface displaying foreign key definition metadata according to some embodiments.

FIG. 7 illustrates user interface 700 displaying foreign key definition metadata associated with table T5ITT7. The metadata includes four foreign key relations, each of which may be checked according to some embodiments.

Foreign key relations 710 and 720 may be checked at S425 as described above, since the foreign key relation table of each of relations 710 and 720 is table T5ITT7. Foreign key relations 730 and 740 specify constant and generic foreign keys, respectively.

Foreign key relation 730 assigns a constant value to a check table key field. During checking of the check table, the constant, rather than a value of a foreign key field, is checked against the check table field. A constant foreign key may be used if only records of the check table which contain a constant value in the check table key field are valid.

S445 of process 400 identifies a constant value within a foreign key relation. If such a relation is identified, then validity, data type and length are checked at S450. Checking the validity at S450 may include checking whether the relation specifies only one constant, and checking the data type may include checking whether the associated check table field is of a character data type. It may be further determined whether the length of the constant is more than the length of the associated check table field.

A generic foreign key allows a key field of a check table to be not assigned to any a foreign key field of the foreign key table. The check occurs against only the remaining key fields of the check table. With reference to foreign key definition 740, check table field ENDDA is not checked against any field of table T5ITT7 when validating input data as described above. S455 of process 400 identifies generic foreign key relations and, for each such identified generic foreign key relation, flow proceeds directly to S430 without conducting any check.

Check results are returned at S430 for each generic foreign key identified at S455, and for each foreign key relation checked at S425, S440 and S450. The results may indicate whether the check was successful or unsuccessful. Check results may also provide an explanation of why a check was unsuccessful. Check results may be transmitted from application server 110 to a requesting developer via an interface provided by dictionary tools 115.

The table below provides examples of check results that may be returned at S430 according to some embodiments.

| Message Description | Explanation | Result |
| --- | --- | --- |
| Valid foreign key mapping | Field in foreign key relation shares the same domain name or data type as check table field. | Success |
| Valid Constant | Valid constant value is specified in the foreign key relation. | Success |
| Generic Key | Field in foreign key relation is marked as generic, and no check was performed. | Success |
| Records exists in check table for <check field> = '*' | A valid foreign key field definition mapping having constant value as '*' and also records exist in check table for such constant value. | Success |
| No records exist in check table for <check field> = '*' | A valid foreign key field relation mapping having constant value as '*'. But, currently there is no content in check table for such constant value. | Warning |
| Valid runtime field | A valid runtime field from the structure SY or SYST, which has client-wide global user information such as client number, user name and logon language etc., is specified as the foreign key relation table field. | Info |
| Helper table specified; Valid field mapping maintained to link and query for FK check | Table name specified in the foreign key relation is another helper table or view that needs to be queried in order to fetch required field value(s) for check at run time. | Hint |
| Invalid field mapping: Data type of FK relation field <> Data type of check table field | Field in foreign key relation doesn't share the domain or datatype as check table field. | Error |
| FK relation table/field doesn't exist | Foreign key relation table or table field doesn't exist. | Error |
| Invalid constant: Check field is non-character datatype | An invalid constant '*' is maintained in foreign key relation against non-character type check field. | Error |
| Invalid Constant: Only one constant value is allowed | More than one value is specified as constant value for this field. | Error |
| Invalid Constant: Length of constant > Length of check table field | The length of constant value specified is longer than the length of the check table field and it may result in incorrect processing of constant value supplied. | Error |
| Invalid runtime field | Field specified for run time structure SY or SYST doesn't exist. | Error |
| FK relation table name not specified | Foreign key relation table name is not specified. | Error |
| Invalid FK relation table | Foreign key relation table name doesn't conform to table naming standards. | Error |
| FK relation table field not specified | Foreign key relation field name is not specified. | Error |
| Invalid FK relation field | Field in foreign key relation doesn't conform to field naming standards. | Error |
| Helper table specified; Invalid mapping: Data type of FK relation field <> Data type of check table field | Another helper table or view is specified in the foreign key relation, but the field from this table/view doesn't share the same data type as the check field in question. | Error |
| Helper table is not a table or view and cannot be queried at runtime | Table name specified in the foreign key relation might be a structure, not an existing table or view that can be queried to fetch required field value(s) at run time. | Error |
| Table doesn't exist | Table doesn't exist in Data Dictionary. | Error |
| No foreign key fields in table | Table has no foreign key fields. | Error |
| Error in getting FK details | Failed to fetch foreign key definition details, possibly due to corrupted table data in the system. | Error |

According to some embodiments, process 400 may be performed to check foreign key definitions associated with one, some, or all database tables in a system, in response to a corresponding request. Check results may therefore be provided for each checked foreign key definition of each database table.

Figure 8:
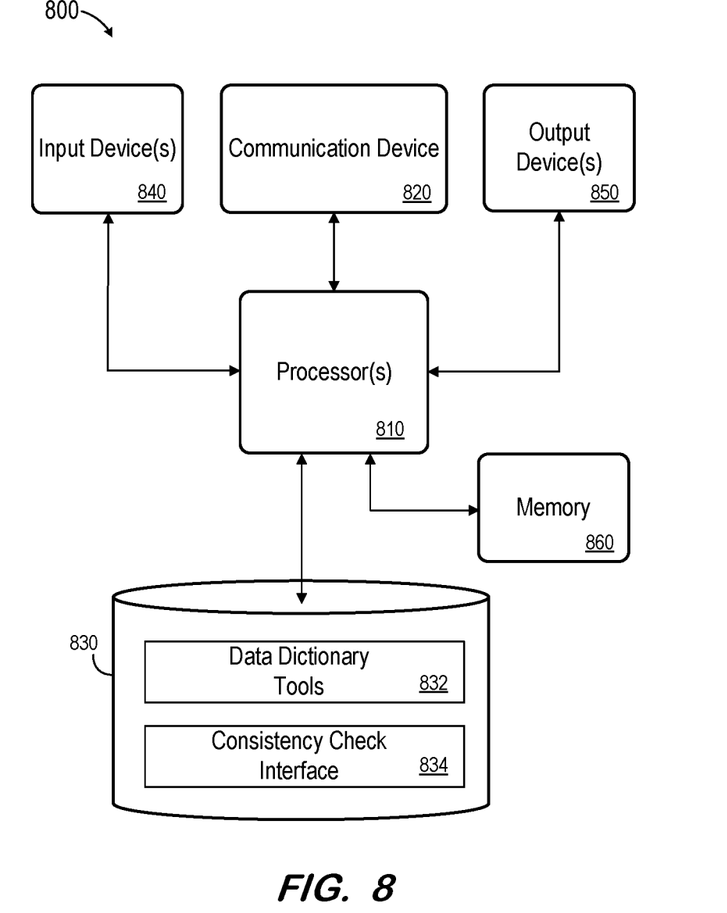
FIG. 8 is a block diagram of a computing system according to some embodiments.

FIG. 8 is a block diagram of computing system 800 according to some embodiments. System 800 may comprise a general-purpose computing apparatus and may execute program code to perform any of the functions described herein. System 800 may comprise an implementation of application server 110 as described above. System 800 may include other unshown elements according to some embodiments.

System 800 includes processor(s) 810 operatively coupled to communication device 820, data storage device 830, one or more input devices 840, one or more output devices 850 and memory 860. Communication device 820 may facilitate communication with external devices, such as a data server. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into system 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM), Storage Class Memory (SCM) or any other fast-access memory.

Data dictionary tools 832 may comprise program code executed by processor 810 to cause system 800 to perform any one or more of the processes described herein and/or attributed to data dictionary tools 115. Embodiments are not limited to execution by a single apparatus. Consistency check interface 834 may comprise program code implementing an interface which may be called by another application to conduct a check of foreign key definitions associated with one or more database tables. Data storage device 830 may also store data and other program code for providing additional functionality and/or which are necessary for operation of system 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps; and
a processor to execute processor-executable process steps to:
receive a request to check a foreign key definition associated with a first database table, the foreign key definition comprising one or more foreign key relations;
determine a first foreign key relation of the foreign key definition, the first foreign key relation identifying a foreign key relation table, a foreign key field and a check table field; and
determine a second foreign key relation of the foreign key definition, the second foreign key relation identifying a second foreign key relation table, a second foreign key field and a second check table field,
wherein, in a case that the first database table is the foreign key relation table identified in the first foreign key relation, determine whether a data type of the identified foreign key field is identical to a data type of the identified check table field, and return a first result associated with the first foreign key relation based on the determination of whether the data type of the identified foreign key field is identical to the data type of the identified check table field,
wherein, in a case that the first database table is not the foreign key relation table identified in the first foreign key relation, determine whether the identified data type of the foreign key field is identical to the identified data type of the check table field, and determine whether the foreign key field is a runtime field of a selectable runtime structure, and return a second result associated with the first foreign key relation based on the determination of whether the identified data type of the foreign key field is identical to the data type of the identified check table field, and the determination of whether the foreign key field is a runtime field of a selectable runtime structure,
wherein, in a case that the first database table is the second foreign key relation table identified in the second foreign key relation, determine whether a second data type of the identified second foreign key field is identical to a second data type of the identified second check table field, and return a third result associated with the second foreign key relation based on the determination of whether the second data type of the identified second foreign key field is identical to the second data type of the identified second check table field, and
wherein, in a case that the database table is not the second foreign key relation table identified in the second foreign key relation, determine whether the identified second data type of the second foreign key field is identical to the identified second data type of the second check table field, and determine whether the second foreign key field is a runtime field of a selectable runtime structure, and return a fourth result associated with the second foreign key relation based on the determination of whether the identified second data type of the second foreign key field is identical to the identified second data type of the second check table field, and on the determination of whether the second foreign key field is a runtime field of a selectable runtime structure.

2. A system according to claim 1, wherein determination of whether the foreign key field is a runtime field of a selectable runtime structure comprises issuing a SELECT statement against the foreign key relation table.

3. A system according to claim 1, the processor to execute processor-executable process steps to:
receive a second request to check a second foreign key definition associated with a second database table, the second foreign key definition comprising one or more second foreign key relations;
determine a third foreign key relation of the second foreign key definition associated with the second database table, the third foreign key relation identifying a second foreign key relation table, a second foreign key field and a second check table field;

wherein, in a case that the second database table is the second foreign key relation table identified in the third foreign key relation of the second foreign key, determine whether a data type of the identified second foreign key field is identical to a data type of the identified second check table field, and return a third result associated with the third foreign key relation based on the determination of whether the data type of the identified second foreign key field is identical to the data type of the identified second check table field; and wherein, in a case that the second database table is not the second foreign key relation table identified in the third foreign key relation of the second foreign key, determine whether the data type of the identified second foreign key field is identical to the data type of the identified second check table field, and determine whether the second foreign key field is a runtime field of a selectable second runtime structure, and return a fourth result associated with the third foreign key relation based on the determination of whether the data type of the identified second foreign key field is identical to the data type of the identified second check table field, and the determination of whether the second foreign key field is a runtime field of a selectable second runtime structure.

4. A system according to claim 3, the processor to execute processor-executable process steps to:
 determine that the third foreign key relation of the second foreign key definition associates a constant value with a third check table field; and
 in response to the determination that the third foreign key relation of the second foreign key definition associates the constant value with the third check table field, determine whether a data length of the third check table field is greater than or equal to the constant value.

5. A system according to claim 1, the processor to execute processor-executable process steps to:
 determine that the first foreign key relation associates a constant value with a second check table field; and
 in response to the determination that the first foreign key relation associates the constant value with the second check table field, determine whether a data length of the second check table field is greater than or equal to the constant value.

6. A computer-implemented method for a client application executing on a client device, the method comprising:
 receiving a request to check a foreign key definition associated with a first database table, the foreign key definition comprising one or more foreign key relations,
 determining a first foreign key relation of the one or more foreign key relations, the first foreign key relation identifying a foreign key relation table, a foreign key field and a check table field; and
 determining a second foreign key relation of the foreign key definition, the second foreign key relation identifying a second foreign key relation table, a second foreign key field and a second check table field,
 wherein, in a case that the first database table is the foreign key relation table identified in the first foreign key relation, determining whether a data type of the identified foreign key field is identical to a data type of the identified check table field, and returning a first result associated with the first foreign key relation based on the determination of whether the data type of the identified foreign key field is identical to the data type of the identified check table field, wherein, in a case that the first database table is not the foreign key relation table identified in the first foreign key relation, determining whether the data type of the identified foreign key field is identical to the data type of the identified check table field, and determining whether the foreign key field is a runtime field of a selectable runtime structure, and returning a second result associated with the first foreign key relation based on the determination of whether the data type of the identified foreign key field is identical to the data type of the identified check table field, and the determination of whether the foreign key field is a runtime field of a selectable runtime structure, wherein, in a case that the first database table is the second foreign key relation table identified in the second foreign key relation, determine whether a second data type of the identified second foreign key field is identical to a second data type of the identified second check table field, and return a third result associated with the second foreign key relation based on the determination of whether the second data type of the identified second foreign key field is identical to the second data type of the identified second check table field, and wherein, in a case that the database table is not the second foreign key relation table identified in the second foreign key relation, determine whether the identified second data type of the second foreign key field is identical to the identified second data type of the second check table field, and determine whether the second foreign key field is a runtime field of a selectable runtime structure, and return a fourth result associated with the second foreign key relation based on the determination of whether the identified second data type of the second foreign key field is identical to the identified second data type of the second check table field, and on the determination of whether the second foreign key field is a runtime field of a selectable runtime structure.

7. A method according to claim 6, wherein determining whether the foreign key field is a runtime field of a selectable runtime structure comprises issuing a SELECT statement against the foreign key relation table.

8. A method according to claim 6, further comprising:
 receiving a second request to check a second foreign key definition associated with a second database table, the second foreign key definition comprising one or more second foreign key relations;
 determining a second foreign key relation of the second foreign key definition, the second foreign key relation identifying a second foreign key relation table, a second foreign key field and a second check table field;
 wherein, in a case that the second database table is the second foreign key relation table identified in the second foreign key relation of the second foreign key definition, determining whether a data type of the identified second foreign key field is identical to a data type of the identified second check table field, and returning a third result associated with the second foreign key relation based on the determination of whether the data type of the identified second foreign key field is identical to the data type of the identified second check table field; and wherein, in a case that the second database table is not the second foreign key relation table identified in the second foreign key relation of the second foreign key definition, determining whether the data type of the identified second foreign key field is identical to the data type of the identified second check table field, and determining whether the second foreign key field is a runtime field of a second selectable runtime structure, and returning a fourth result associated with the second foreign key relation based on the determination of whether the data type of the identified second foreign key field is identical to the data type of the identified second check table field, and the determination of whether the second foreign key field is a runtime field of a selectable second runtime structure.

9. A method according to claim 8, further comprising:
determining that the second foreign key relation of the second foreign key definition associates a constant value with a third check table field; and
in response to the determination that the second foreign key relation of the second foreign key definition associates the constant value with the third check table field, determining whether a data length of the third check table field is greater than or equal to the constant value.

10. A method according to claim 6, further comprising:
determining that the first foreign key relation associates a constant value with a second check table field; and
in response to the determination that the first foreign key relation associates the constant value with the second check table field, determining whether a data length of the second check table field is greater than or equal to the constant value.

11. A non-transitory computer-readable medium storing computer-executable process steps which, when executed by a computing device, cause the computing device to:
receive a request to check a foreign key definition associated with a first database table, the foreign key definition comprising one or more foreign key relations;
determine a first foreign key relation of the foreign key definition, the first foreign key relation identifying a foreign key relation table, a foreign key field and a check table field; and
determine a second foreign key relation of the foreign key definition, the second foreign key relation identifying a second foreign key relation table, a second foreign key field and a second check table field,
wherein, in a case that the first database table is the foreign key relation table identified in the first foreign key relation, determine whether a data type of the identified foreign key field is identical to a data type of the identified check table field, and return a first result associated with the first foreign key relation based on the determination of whether the data type of the identified foreign key field is identical to the data type of the identified check table field,
wherein, in a case that the database table is not the foreign key relation table identified in the first foreign key relation, determine whether the data type of the identified foreign key field is identical to the data type of the identified check table field, and determine whether the foreign key field is a runtime field of a selectable runtime structure, and return a second result associated with the first foreign key relation based on the determination of whether the data type of the identified foreign key field is identical to the data type of the identified check table field, and the determination of whether the foreign key field is a runtime field of a selectable runtime structure,
wherein, in a case that the first database table is the second foreign key relation table identified in the second foreign key relation, determine whether a second data type of the identified second foreign key field is identical to a second data type of the identified second check table field, and return a third result associated with the second foreign key relation based on the determination of whether the second data type of the identified second foreign key field is identical to the second data type of the identified second check table field, and
wherein, in a case that the database table is not the second foreign key relation table identified in the second foreign key relation, determine whether the identified second data type of the second foreign key field is identical to the identified second data type of the second check table field, and determine whether the second foreign key field is a runtime field of a selectable runtime structure, and return a fourth result associated with the second foreign key relation based on the determination of whether the identified second data type of the second foreign key field is identical to the identified second data type of the second check table field, and on the determination of whether the second foreign key field is a runtime field of a selectable runtime structure.

12. A medium according to claim 11, wherein determination of whether the foreign key field is a runtime field of a selectable runtime structure comprises issuing a SELECT statement against the foreign key relation table.

13. A medium according to claim 11, the computer-executable process steps, when executed by a computing device, cause the computing device to:
receive a second request to check a second foreign key definition associated with a second database table, the second foreign key definition comprising one or more second foreign key relations;
determine a second foreign key relation of the second foreign key definition, the second foreign key relation identifying a second foreign key relation table, a second foreign key field and a second check table field;
wherein, in a case that the second database table is the second foreign key relation table identified in the second foreign key relation of the second foreign key definition, determine whether a data type of the identified second foreign key field is identical to a data type of the identified second check table field, and return a third result associated with the second foreign key relation of the second foreign key definition based on the determination of whether the data type of the identified second foreign key field is identical to the data type of the identified second check table field; and
wherein, in a case that the second database table is not the foreign key relation table identified in the second foreign key relation of the second foreign key definition, determine whether the data type of the identified second foreign key field is identical to the data type of the identified second check table field, and determine whether the second foreign key field is a runtime field of a selectable second runtime structure, and return a fourth result associated with the second foreign key relation of the second foreign key definition based on the determination of whether the data type of the identified second foreign key field is identical to the data type of the identified second check table field, and the determination of whether the second foreign key field is a runtime field of a selectable second runtime structure.

14. A medium according to claim 13, the computer-executable process steps, when executed by a computing device, cause the computing device to:
- determine that the second foreign key relation of the second foreign key definition associates a constant value with a third check table field; and
- in response to the determination that the second foreign key relation of the second foreign key definition associates the constant value with the third check table field, determine whether a data length of the third check table field is greater than or equal to the constant value.

15. A medium according to claim 11, the computer-executable process steps, when executed by a computing device, cause the computing device to:
- determine that the first foreign key relation associates a constant value with a second check table field; and
- in response to the determination that the first foreign key relation associates the constant value with the second check table field, determine whether a data length of the second check table field is greater than or equal to the constant value.

* * * * *